Jan. 24, 1939. H. A. DOUGLAS 2,145,164
ELECTRICAL CONNECTION MEANS
Filed July 17, 1935
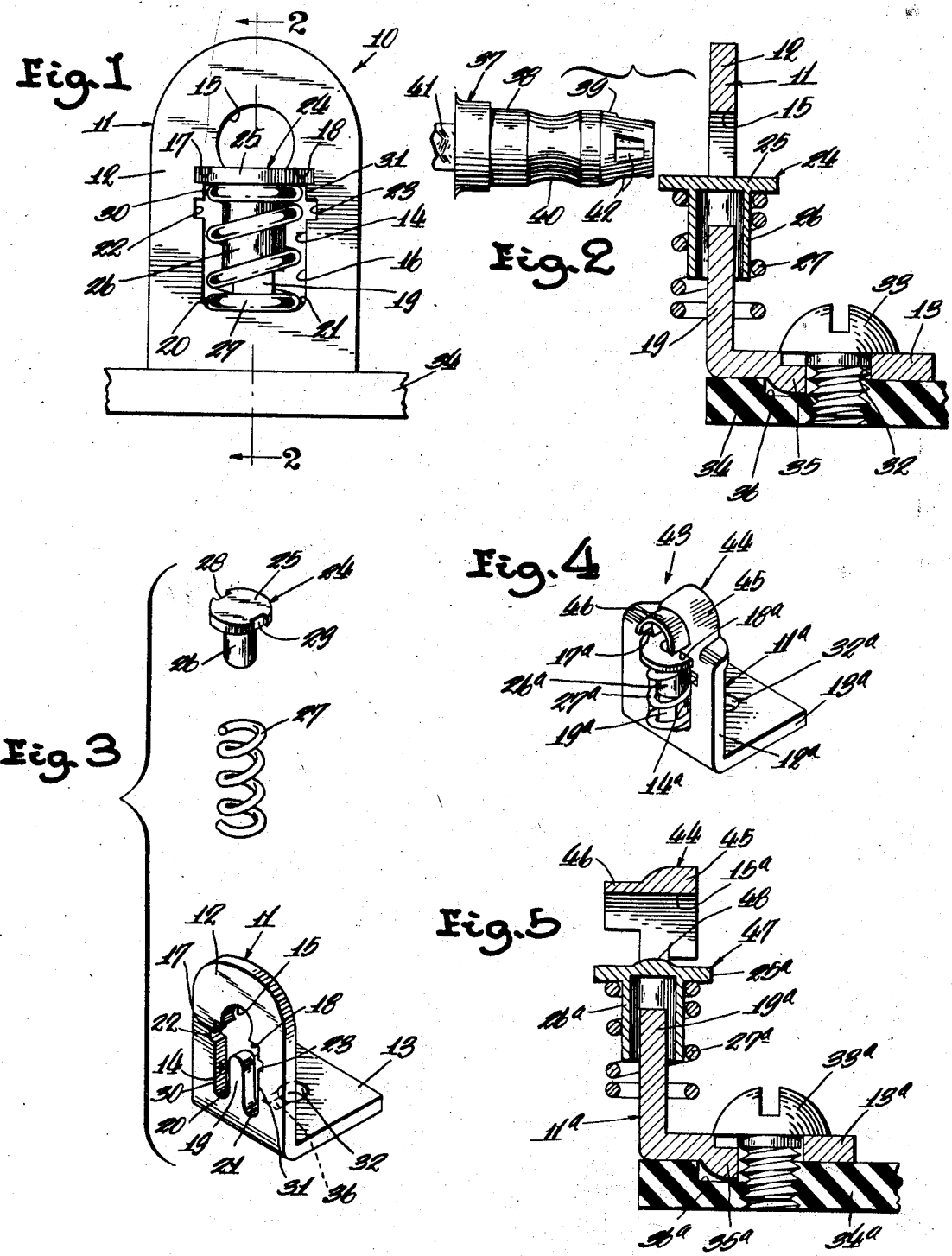
Harry A. Douglas
INVENTOR
BY Freeman, Sweet, Albrecht and Weidman
ATTORNEYS Patented Jan. 24, 1939

UNITED STATES PATENT OFFICE 2,145,164

ELECTRICAL CONNECTION MEANS

Harry A. Douglas, Bronson, Mich., assignor to Kingston Products Corporation, a corporation of Indiana Application July 17, 1935, Serial No. 31,809

12 Claims. (Cl. 173—328)

My invention relates to electrical connection means, and more particularly to means for receiving conductor terminals of the snap type, and the principal object of my invention is to provide new and improved electrical connection means of these types. In the drawing accompanying this specification and forming a part of this application, I have shown, for purposes of illustration, several forms which my invention may assume. In this drawing:

Figure 1 is an elevation of one embodiment of my invention,

Figure 2 is a section taken on the line 2—2 of Figure 1, looking in the direction of the arrows, with a plug conductor terminal added, Figure 3 is a perspective view of the parts of the terminal post shown in Figure 1, disassembled, Figure 4 is a perspective view of another embodiment of my invention, and Figure 5 is a longitudinal sectional view of the embodiment shown in Figure 4, including a base shown fragmentarily.

Referring in detail to the embodiment of my invention shown in Figures 1, 2, and 3, a terminal post 10 includes a body 11 here shown as made of sheet metal stock, having, as viewed in the drawing, a vertical plane wall 12, of desired extent, and a horizontal wall 13, serving as a foot, integral with the vertical wall 12 and extending at right angles therefrom at the lower end thereof.

The vertical wall 12 is provided with a desired number of composite apertures, one composite aperture 14 being shown including an arcuate recess 15, forming the upper end of the composite aperture 14, and a generally rectangular aperture 16 forming the lower portion of the composite aperture. The generally rectangular aperture 16 merges with the arcuate recess 15, and, being of greater width than the width or diameter of the arcuate recess 15, forms shoulders 17, 18 at opposite sides of the junction of the arcuate recess 15 and generally rectangular aperture 16. Extending longitudinally upwardly from the center of the lower margin of the generally rectangular aperture 16 is a projection or tongue 19 in the plane of and integral with the vertical wall 12. The sides of the tongue 19, at the root thereof, may merge with fillets 20, 21, in turn merging with the lower ends of the respective vertical margins 30, 31 of the generally rectangular aperture 16.

Near the top of the generally rectangular aperture 16 the vertical margins 30, 31 of the aperture 16 are provided with recesses or notches 22, 23, here shown as of rectangular form, and each disposed the same predetermined distance below the shoulders 17, 18.

Cooperable with the arcuate recess 15 is a biasing means 24, here shown as having a head comprising a plane disc 25 provided with an axially extending concentric tubular shank 26. The diameter of the disc 25 is greater than the horizontal width of the generally rectangular aperture 16. The tubular shank 26 is here shown as having disposed therein the upper portion of the tongue 19, there being ample clearance between the tongue 19 and the inner periphery of the tubular shank 26. Disposed about the tubular shank 26 is a helical spring 27, one end of which engages the underside of the disc 25 of the biasing means 24 and the other end of which engages the fillets 20, 21 at the lower end of the generally rectangular aperture 16. The spring 27 serves to bias the biasing means 24 toward the arcuate recess 15, the upper side of the disc 25, when no plug conductor terminal is associated with the terminal post, being in engagement with the shoulders 17, 18, so that the upper surface of the disc 25, as viewed in Figure 1, forms a chord across the arcuate recess 15. The biasing means is prevented from moving laterally at its upper end by providing the periphery of the disc 25 with two diametrically opposite recesses 28, 29 of rectangular cross-section, the circumferential width and radial depth of these recesses 28, 29 being such that they slidably embrace the vertical sides 30, 31, of the generally rectangular aperture 16.

The foot 13 of the terminal post 10 may be provided with an aperture 32 through which a screw 33 or any other suitable fastening means may be disposed, to fasten the foot 13 to a base 34. The foot 13 may be prevented from turning about the fastening means 33 by a projection 35, struck downwardly from the foot 13, the projection being adapted to be disposed in a recess 36 in the base 34.

The terminal post 10 is adapted to cooperate with a plug conductor terminal 37 of the snap type, here shown as comprising a generally cylindrical portion 38 and a frustro-conical end 39, the cylindrical portion 38 being provided with an annular furrow 40. The conductor terminal 37 may be fastened to a conductor 41 disposed therein by swedging, as indicated by swedge indentations 42. In order to connect the plug conductor terminal 37 to the terminal post 10 the plug terminal 37 is alined with the arcuate recess 15 and the frustro-conical end 39 is inserted in the recess 15. The upper portion of the frustro-conical end 39, in cooperation with the upper margin of the arcuate recess 15 causes generally downward movement of the conductor terminal 37 and particularly the end thereof, the lower portion of the conductor terminal 37, in contact with the flat upper face of the disc 25 causing the biasing means 24 to be moved downwardly against the bias of the spring 27. The disc 25 is thus moved away from the shoulders 17, 18, but not far enough so that the disc would register with the recesses 22, 23. Further inserting movement of the plug conductor terminal 37 causes it to snap into a position in which the upper inside surface, or the lateral margins of the upper inside surface, of the arcuate recess 15 are in engagement with the annular furrow 40. In this position the disc 25 is also out of engagement with the shoulders 17, 18, and therefore is pressed against the lower part of the cylindrical surface 38 of the conductor terminal 37, thereby pressing the conductor terminal 37 firmly against the upper part of the arcuate recess 15. The conductor terminal 37 may of course be removed by pulling it out of engagement with the recess 15, against the bias of the biasing means 24.

It will be apparent that during the longitudinal movements of the biasing means 24 it is guided at the top by the sides 30, 31 of the aperture 16, and at the bottom by the spring 27 aided by the tongue 19. The tongue 19 will in any event prevent undue lateral movement of the shank 26 by direct cooperation with the shank.

The biasing means 24 may be assembled with and disassembled from the body 11 of the terminal post 10 as follows. Assuming the parts to be in the position of Figure 1, the biasing means 24 may be moved downwardly, against the bias of the spring 27, far enough so that the disc 25 is in registry with the recesses 22, 23. The distance between the bottoms of the recesses 22, 23 being greater than the diameter of the disc 25, the biasing means 24 may then be tilted outwardly and it and the spring 27 removed from the tongue 19 by a combined motion of rotation and translation. It will be obvious that the biasing means 24 and spring 27 may be assembled with the body of the terminal post 10 by a procedure the reverse of that hereinbefore described.

Referring now to the embodiment shown in Figures 4 and 5, in this embodiment, in which parts analogous to parts in Figures 1, 2, and 3 have been designated by the same reference numerals with the suffix a, the body of the terminal post 43 here shown includes a vertical wall 12a provided with a composite aperture 14a including a recess 15a of arcuate form near the top of the vertical wall 12a. The arcuate recess 15a has the upper portion of its inside wall extended in both directions laterally from the locus of the plane lateral faces of the vertical wall 12a. That portion extending laterally toward the right, as viewed in Figures 4 and 5, is formed by bending the upper end 44 of the vertical wall 12a at right angles to that wall and forming a part of the bent-over portion into an arcuate flange 45 having an inside surface continuous with the recess 15a. That portion extending laterally to the left is formed by a flange 46, formed by drawing out the metal theretofore forming part of the vertical wall 12a removed to form the arcuate recess 15a. The inside surface of the flange 46 is continuous with the upper inside surface of the recess 15a.

The terminal post 43 is also provided with biasing means 47 for cooperation with the arcuate recess 15a, but, in this instance, while the biasing means 47 is otherwise similar to the biasing means 24 shown in Figures 1, 2, and 3, the disc portion 25a thereof is here provided with a centrally located rounded protuberance 48. The composite aperture 14a being formed the same as the composite aperture 14 of Figures 1, 2, and 3, it will be evident that the biasing means 47 is held in cooperative relation with the body 11a of the terminal post 43, and cooperates with the various parts of the composite aperture 14a in the same manner as already described in connection with the biasing means 24 of Figures 1, 2, and 3.

The embodiment of Figures 4 and 5 operates as follows. Assuming the parts to be in the position shown in Figures 4 and 5, insertion of a plug conductor terminal 37 will cause the frustro-conical end 39 to act against the rounded protuberance 48, thereby forcing the biasing means 47 downwardly against the bias of the spring 27a, further inserting movement causing the rounded protuberance to snap into the annular furrow 40. As in the case of Figures 1, 2, and 3, the upper surface of the disc 25a of the biasing means 47 under these circumstances is desirably out of contact with the shoulders 17a, 18a, so that the plug conductor terminal 37 is firmly pressed against the upper portion of the wall of the recess 15a.

The protuberance 48 may be of such length that when the plug conductor terminal 37 is inserted in the terminal post 43, the end of the protuberance 48 will or will not bottom in the furrow 40. Even if the protuberance does not bottom in the furrow 40, the conductor terminal will nevertheless be held connected to the post since the flat portion of the disc 25a will engage the cylindrical surface 38 of the conductor terminal 37, and the protuberance 48 will engage a side surface of the furrow 40 if the conductor terminal is moved longitudinally with a force less than that required to intentionally withdraw it from the post 43.

It will be apparent that the biasing means 47 and the spring 27a may be assembled with and disassembled from the body of the terminal post 43 in the manner already described in connection with the biasing means 24 of Figures 1, 2, and 3.

While the plug conductor terminal 37 has been described as insertable into the terminal posts 10 and 43 from the left hand side thereof, as viewed in Figures 2 and 5, it will be apparent that the plug conductor terminal may be inserted into these posts from the right hand side.

From the foregoing it will be apparent to those skilled in the art that the illustrated embodiments of my invention provide new and improved electrical connection means, readily and conveniently constructed and assembled, and accordingly, each accomplishes at least the principal object of my invention. On the other hand, it also will be obvious to those skilled in the art that the illustrated embodiments of my invention may be variously changed and modified, or features thereof, singly or collectively, embodied in other combinations than those illustrated, without departing from the spirit of my invention, or sacrificing all of the advantages thereof, and that accordingly, the disclosure herein is illustrative only, and my invention is not limited thereto.

I claim:

1. Receptacle means, for receiving and holding a conductor terminal, comprising: a body portion, having a recess for receiving a conductor terminal, said body portion also having tongue means formed intermediate the margins thereof; and means for biasing a conductor against a surface of said recess, said tongue means cooperating with said biasing means to hold the same in assembled relation with respect to said body portion.

2. Receptacle means, for receiving and holding a conductor terminal, comprising: a body portion, having a recess for receiving a conductor terminal, said body portion also having tongue means formed intermediate the margins thereof; and means for biasing a conductor against a surface of said recess; said tongue means being disposed in the plane of movement of said biasing means and cooperating with said biasing means to hold the same in assembled relation with respect to said body portion.

3. Receptacle means, for receiving and holding a conductor terminal, comprising: a body portion, including a generally plane wall having a first aperture for receiving a conductor terminal, said wall also having a second aperture provided with locally recessed margins; biasing means for biasing a conductor terminal against a wall of said first aperture, and having portions cooperable with margins of said second aperture to provide for movement in a longitudinal direction only, said biasing means being movable into alignment with said recessed margins of said second aperture, so as to be movable laterally to provide for disassembly thereof with respect to said body portion.

4. Receptacle means, comprising: a body, including a wall having an aperture comprising a first portion for receiving a conductor terminal, and a second portion communicating with said first portion and forming a shoulder therebetween, a member, mounted for reciprocable movement in said second portion, and having recesses, the marginal surfaces of which interengage with the marginal surfaces of said second portion; and spring means, for urging said member into engagement with said shoulder; the marginal surfaces of the second portion of said wall aperture having recesses spaced from said shoulder, and providing for the assembly or disassembly of said member with respect to said wall.

5. Receptacle means, comprising: a body, including a wall having an aperture comprising a first portion for receiving a conductor terminal, and a second portion communicating with said first portion, said wall having also a tongue extending into said second portion; a member, having a head slidably engaging the marginal surfaces of the second portion of said wall aperture, and having also a tubular part fitting over said tongue; and spring means, disposed about said tubular part, constructed and arranged to urge said head toward the first portion of said aperture, so that said head yieldably engages a conductor terminal disposed in the first portion of said aperture.

6. Receptacle means, comprising: a sheet-metal wall, having a generally circular aperture, and a generally rectangular aperture communicating at one end with said circular aperture, and forming shoulders adjacent the point of communication, said rectangular aperture having recesses formed in its opposite side margins and spaced from said shoulders, and also having a tongue extending from its opposite end margin in a direction toward said circular aperture; a detent member, comprising a disc-like head provided with marginal recesses, the defining surfaces of said head recesses engaging the wall adjacent the sides of said rectangular aperture, said detent member comprising also a tubular portion fitting over said tongue; resilient means, for urging said detent member to engagement with said shoulders; said detent member being disassemblable by moving said disc-like head into alignment with the recesses spaced from said shoulders and against the bias of said resilient means, and then moving said detent member laterally and away from said body.

7. Receptacle means, comprising: a sheet-metal wall, having an aperture, certain portions of said wall being extended to form a continuation surface of at least a part of the marginal surface of said aperture; biasing means, comprising a disc-like detent member having a projection directed toward said aperture, said detent member being mounted for sliding movement along said wall, toward and away from said aperture, and said biasing means comprising also spring means for urging said detent member toward said aperture; means abutted by said detent member to limit movement of said detent member in a direction toward said aperture, said abutment means being so constructed and arranged that said detent member may traverse a part of said aperture but is prevented from completely traversing said aperture, thereby to provide a recess which may be yieldably increased in size, and into which a plug conductor terminal of the snap-type may be thrust and yieldably held interposed between said continuation surface and said disc-like detent member under the biasing action of said spring means, said detent member projection being engageable within the recess provided in the snap-type plug to hold the plug against unintentional displacement from said receptacle means.

8. Receptacle means of the character set forth in claim 1, in which a portion of the body portion is flared adjacent the conductor terminal recess whereby to provide a curved bearing surface for the terminal.

9. Receptacle means of the character set forth in claim 2, in which the upper extremity of the body portion is flared adjacent the conductor terminal recess whereby to provide a channel-like bearing surface for the terminal.

10. Receptacle means of the character set forth in claim 3, in which the upper extremity of the body portion is flared adjacent the conductor terminal aperture whereby to provide an elongated bearing surface for the terminal, arranged substantially transverse to the plane of said body portion.

11. Receptacle means of the character set forth in claim 5, in which the upper extremity of the body is flared whereby to provide an elongated bearing surface for the terminal of a length substantially corresponding to the width of the head of said slidable member.

12. Receptacle means of the character set forth in claim 6, in which the upper extremity of said sheet metal wall is flared outwardly from the opposite sides of said wall whereby to provide a channel-like bearing surface for a terminal adapted to be inserted through said circular aperture provided in said wall.

HARRY A. DOUGLAS.